(12) United States Patent
Nandagopal (10) Patent No.: US 10,127,017 B2
(45) Date of Patent: Nov. 13, 2018

(54) DEVOPS MANAGEMENT (71) Applicant: VMWARE, INC., Palo Alto, CA (US)

(72) Inventor: Lokesh Kumar Nandagopal, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 15/408,454

(22) Filed: Jan. 18, 2017

(65) Prior Publication Data
US 2018/0136988 A1 May 17, 2018

(30) Foreign Application Priority Data
Nov. 17, 2016 (IN) .............. 2016641039182

(51) Int. Cl.
G06F 9/44 (2018.01)
G06F 8/20 (2018.01)
G06F 9/54 (2006.01)
G06F 8/70 (2018.01)
G06F 11/36 (2006.01)
G06F 8/60 (2018.01)
G06F 8/30 (2018.01)
(Continued)

(52) U.S. Cl.
CPC .............. G06F 8/20 (2013.01); G06F 3/0482 (2013.01); G06F 8/30 (2013.01); G06F 8/60 (2013.01); G06F 8/70 (2013.01); G06F 9/542 (2013.01); G06F 11/3668 (2013.01); G06Q 10/06 (2013.01)

(58) Field of Classification Search
CPC ................................ G06F 8/20–8/34

USPC .................................. 717/100–113
See application file for complete search history.

(56) References Cited

U.S. PATENT DOCUMENTS 6,810,503 B1 * 10/2004 David ............... G06F 17/30017
707/E17.009
8,341,591 B1 * 12/2012 Knauth .................... G06F 8/71
705/7.13
(Continued)

OTHER PUBLICATIONS

Modern DevOps: Optimizing Software Development Through Effective System Interactions; Constantine Aaron Cois, Joseph Yankel, Anne Connell—Carnegie Mellon University, Software Engineering Institute; 2014 IEEE International Professional Communication Conference (IPCC).*

(Continued)

Primary Examiner — Francisco Aponte
(74) Attorney, Agent, or Firm — Clayton, McKay & Bailey, PC (57) ABSTRACT The present disclosure is related to devices and methods for devops management. One or more devices can include instructions to receive indications associated with execution events of a release of an application over a period of time, wherein the execution events include positive execution events and negative execution events, and provide a graphical user interface (GUI) configured to display a timeline in a first portion of the GUI corresponding to the release of the application over the period of time, wherein the timeline includes a display element for each of the execution events in a respective portion of the timeline corresponding to an execution time of the execution event, and provide a plurality of selectable options, wherein each option, upon being selected, causes a different section of the timeline to be displayed by a second portion of the GUI.

19 Claims, 3 Drawing Sheets (51) Int. Cl.
*G06F 3/0482* (2013.01)
*G06Q 10/06* (2012.01)

(56) References Cited

U.S. PATENT DOCUMENTS

| | | | | |
|---|---|---|---|---|
| 8,601,442 B2* | 12/2013 | Shafi | G06F 11/323 | 717/125 |
| 8,793,578 B2* | 7/2014 | Mounty | G06F 11/3688 | 715/704 |
| 8,819,617 B1* | 8/2014 | Koenig | G06F 8/70 | 717/101 |
| 8,930,882 B2* | 1/2015 | Herbert | G06Q 10/063112 | 717/101 |
| 9,246,773 B2 | 1/2016 | Degioanni | | |
| 9,501,751 B1* | 11/2016 | Holler | G06Q 10/06 | |
| 9,619,208 B2* | 4/2017 | Davidov | G06F 8/20 | |
| 9,740,457 B1* | 8/2017 | Liu | G06F 8/00 | |
| 2005/0114829 A1* | 5/2005 | Robin | G06Q 10/06 | 717/101 |
| 2007/0168918 A1* | 7/2007 | Metherall | G06Q 10/06 | 717/101 |
| 2009/0199113 A1* | 8/2009 | McWhinnie | G06Q 10/06 | 715/762 |
| 2009/0293074 A1* | 11/2009 | Rohwer | G06Q 10/06 | 719/328 |
| 2010/0185932 A1* | 7/2010 | Coffman | G06Q 10/10 | 715/230 |
| 2011/0191746 A1* | 8/2011 | Packbier | G06F 9/44 | 717/103 |
| 2011/0289475 A1* | 11/2011 | Sukhenko | G06F 8/20 | 717/103 |
| 2012/0017195 A1* | 1/2012 | Kaulgud | G06F 11/3692 | 717/101 |
| 2012/0096425 A1* | 4/2012 | Gupta | G06F 8/70 | 717/101 |
| 2014/0095425 A1* | 4/2014 | Sipple | G06N 7/005 | 706/52 |
| 2014/0096109 A1 | 4/2014 | Beno et al. | | |
| 2014/0115557 A1* | 4/2014 | Holler | G06F 9/44 | 717/102 |
| 2014/0282426 A1* | 9/2014 | Kirshenbaum | G06F 8/70 | 717/128 |
| 2014/0331172 A1* | 11/2014 | Holler | G06F 3/04842 | 715/803 |
| 2015/0082281 A1* | 3/2015 | Koenig | G06F 11/3668 | 717/124 |
| 2015/0148138 A1* | 5/2015 | Rabin | A63F 13/60 | 463/43 |
| 2016/0054981 A1* | 2/2016 | Cao | G06F 8/34 | 717/109 |
| 2016/0179506 A1* | 6/2016 | Herbert | G06Q 10/063112 | 717/101 |
| 2016/0231999 A1* | 8/2016 | Holler | G06F 9/44 | |
| 2016/0232003 A1* | 8/2016 | Kompella | G06F 8/77 | |
| 2016/0364210 A1* | 12/2016 | Davidov | G06F 8/20 | |

OTHER PUBLICATIONS

Integrating agile software development into stage-gate managed product development; Daniel Karlstrom and Per Runeson; Department of Communication Systems, Lund University. Empir Software Eng (2006) 11: 203-225.*

* cited by examiner

DEVOPS MANAGEMENT

RELATED APPLICATIONS

Benefit is claimed under 35 U.S.C. 119(a)-(d) to Foreign Application Serial No. 2016410391.82 filed in India entitled "DEVOPS MANAGEMENT", on Nov. 17, 2016, by VMware Inc., which is herein it in its entirety by reference for all purposes.

BACKGROUND

In devops, the process associated with releasing an application can include stages of building, testing, and releasing portions of the application throughout the entire lifecycle of the application. The release of an application can be conceptualized by a timeline that includes a number of events defining the application's lifecycle. In previous approaches to devops management, finding a particular event that happened during a specific time period may be a tedious and/or time-consuming task.

DETAILED DESCRIPTION

Devops refers to a practice of operations and development engineers participating together in the entire service lifecycle of a product (hereinafter "application") from design through the development process to production support. Devops includes the blending of tasks performed by an entity's application development and systems operations teams.

With automation becoming increasingly prominent in devops practices, there has emerged a desire for a graphical user interface that allows users to find and/or visualize events of an application's lifecycle (e.g. timeline, pipeline, etc.). A better understanding of these events—including when they occurred how they relate to other events, and why they may have failed—can allow for more informed devops management.

For example, a manager may seek an understanding of how often failures in systems on which a particular application depends are causing builds of the application to fail. In other words, the manager may desire to better understand the cumulative impact of that class of failures on the release pipeline of the application. In previous approaches, that manager may rely on the process of maintaining a record of defects (e.g., Bugzilla defects) filed against those systems over time, for instance.

Embodiments of the present disclosure can provide a visualization capability to that manager to allow him to see, at a glance, how often build failures may have been caused by a failure in the underlying set of systems. Embodiments herein can provide valuable meaning and insight to a user and can thereby enhance devops management. Where aspects of multiple releases of an application overlap, embodiments of the present disclosure can allow users to visualize systemic problems, chokepoints, and/or common reasons for failures across different releases. In previous approaches that do not provide the user with a holistic visualization of application releases, such problems may go unnoticed for long periods of time. Multiple releases of multiple applications can be shown by embodiments herein; some embodiments may provide a filter such that one or more of the releases and/or one or more of the applications are visible.

In addition, embodiments herein can automatically (e.g., without user input) identify patterns and/or correlations in events. For instance, if testing phases are failing at a rate that exceeds a threshold, embodiments herein can provide a notification to a user indicating that testing phases may be revised and/or improved. Further, embodiments herein can revise aspects of an application's lifecycle based on a determined pattern of failures. In some embodiments, an order of the phases of an application's lifecycle can be modified, aspects of those phases may be modified, and certain phases may be enhanced or removed from the lifecycle.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being, able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

As previously discussed, an application can have a clomps lifecycle (or pipeline), which may be herein represented by a "timeline" corresponding to a period of time. The timeline can include events associated with a release of the application that occur during the lifecycle. These events may be termed "execution events" and include stages (e.g. phases) in the release process of the application. Events may refer to events associated with development stages of the application (development events), events associated with unit testing stages of the application (unit testing events), events associated with functional testing stages of the application (functional testing events), or events associated with deployment stages of the application (deployment events). As referred to herein, a release includes a release of a version an iteration, an update and/or a modification of an application. A release can refer to a new application or to an existing application. A release can refer to a release of an existing application on a different platform.

Events can occur at different times along the timeline. Events can have different durations. In some embodiments, an event can occur over a moment in time. In some embodiments, an event can occur over hours, days, weeks, etc. Events can be "positive" or "negative" events. A negative event is an event where a portion (e.g., stage and/or phase) of the release of the application failed. A positive event is an event where a portion of the release of the application did not fail. Factors constituting failure or non-failure may be specific to a particular application and/or particular event. For instance, failure can include a failure of one or more unit tests. Failure can include the elapsing of a period of time allowed for a stage of the application (e.g., a timeout). A positive event can include, for instance, a successful functional test of the application. Embodiments herein are not limited to particular circumstances that dictate failure or non-failure of portions of the release.

Figure 1:
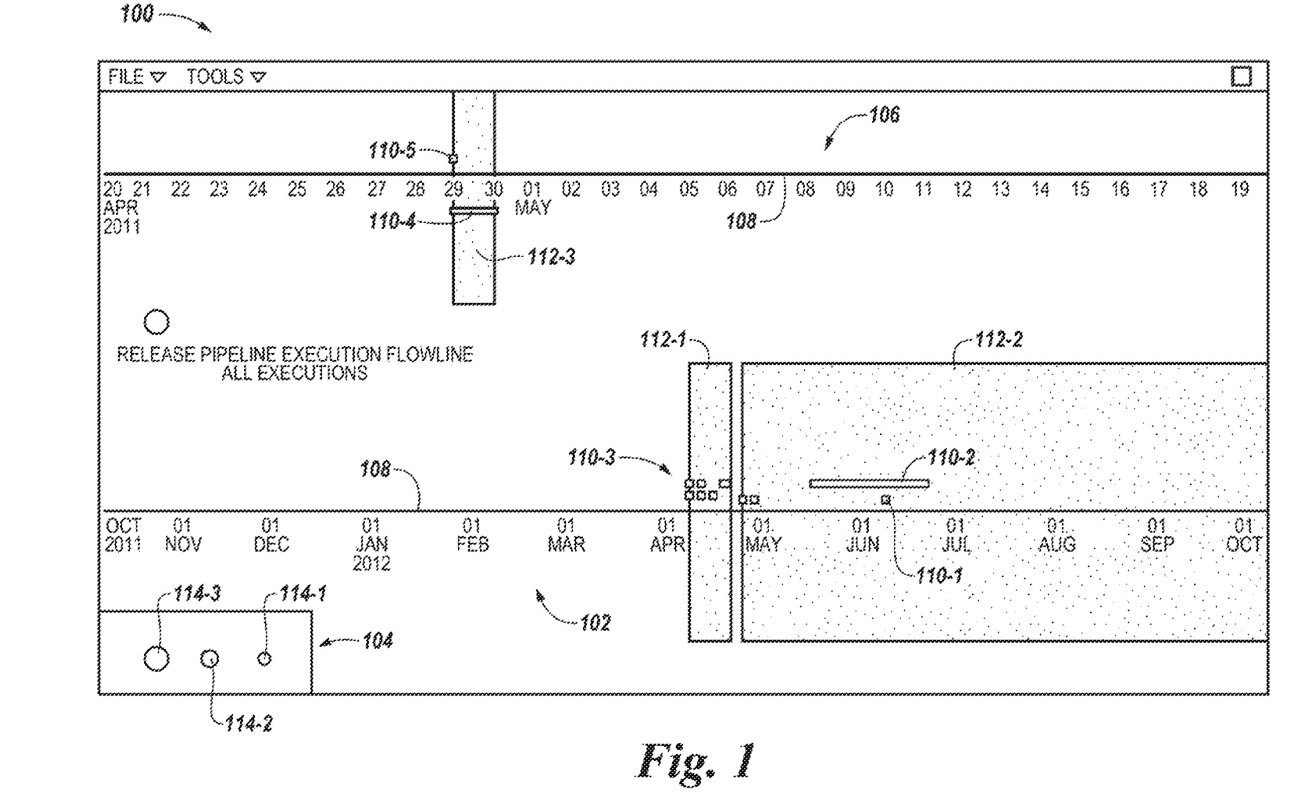
FIG. 1 illustrates a graphical user interface (GUI) according to a number of embodiments of the present disclosure.

FIG. 1 illustrates a graphical user interface (GUI) 100 according to a number of embodiments of the present disclosure. The GUI 100 can be displayed by, a computing device, for instance. In some embodiments, the GUI 100 can be a website. It is noted that where the term "website" is used herein, "website" is intended to refer to one or more web pages of a website unless otherwise indicated. FIG. 1 is described in more detail below following the description of FIGS. 2-3.

Figure 2:
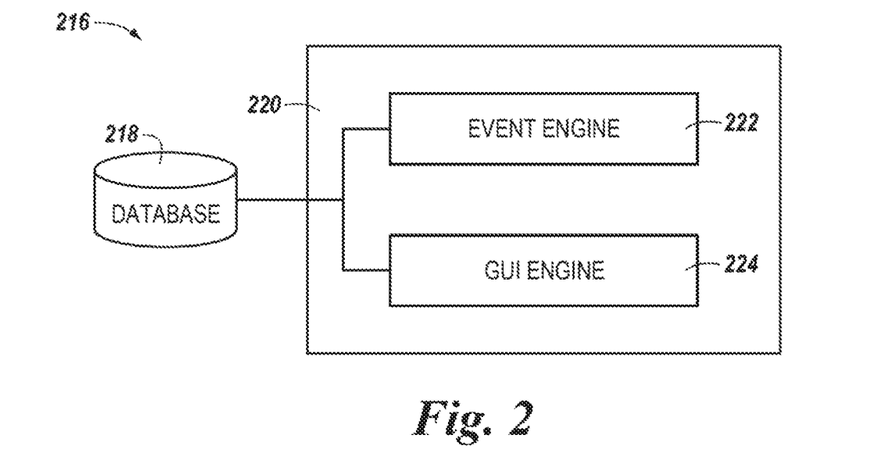
FIG. 2 is a diagram of a system for a devops management according to a number of embodiments of the present disclosure.

FIG. 2 is a diagram of a system 216 for a devops management according to a number of embodiments of the present disclosure. The system 216 can include a database 218, a subsystem 220, and/or a number of engines, for example event engine 222 and GUI engine 224, and can be in communication with the database 218 via a communication link. The system 216 can include additional or fewer engines than illustrated to perform the various functions described herein. The system can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the event engine 222 can include a combination of hardware and program instructions that is configured to receive (e.g., gather) indications associated with execution events of a release of an application over a period of time, wherein the execution events include positive execution events and negative execution events. In some embodiments, the events can be received from an event generator (e.g., a back end event generator). The execution events can be produced from an application's build release for instance.

In some embodiments, the GUI engine 224 can include a combination of hardware and program instructions that is configured to provide a GUI. An example of the GUI provided by the GUI engine can be seen with reference to FIG. 1.

Figure 3:
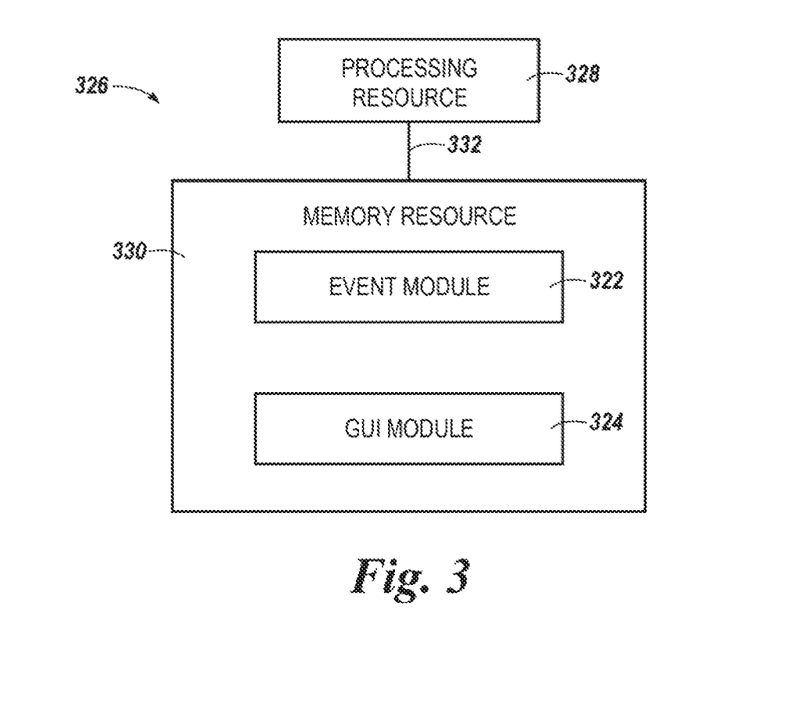
FIG. 3 is a diagram of a machine for devops management according to a number of embodiments of the present disclosure.

FIG. 3 is a diagram of a machine 326 for devops management according to a number of embodiments of the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 328 and a number of memory resources 330, such as a machine-readable medium (MRM) or other memory resources 330. The memory resources 330 can be internal and/or external to the machine 326 (e.g., the machine 326 can include internal memory resources and have access to external memory resources). In some embodiments, the machine 326 can be a virtual computing instance (VCI) or other computing device. The term "VCI" covers a range of computing functionality. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor of separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

The program instructions (e.g., machine-readable instructions (MRI)) can include instructions stored on the MRM to implement a particular function (e.g., an action such as displaying a GUI). The set of MRI can be executable by one or more of the processing resources 328. The memory resources 330 can be coupled to the machine 326 in a wired and/or wireless manner. For example, the memory resources 330 can be an internal memory, a portable memory, a portable disk, and/or a memory associated with another resource, e.g., enabling MRI to be transferred and/or executed across a network such as the Internet. As used herein, a "module" can include program instructions and/or hardware but at least includes program instructions.

Memory resources 330 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 328 can be coupled to the memory resources 330 via a communication path 332. The communication path 332 can be local or remote to the machine 326. Examples of a local communication path 332 can include an electronic bus internal to a machine, where the memory resources 330 are in communication with the processing resources 328 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 332 can be such that the memory resources 330 are remote from the processing resources 328, such as in a network connection between the memory resources 330 and the processing resources 328. That is, the communication path 332 can be a network connection. Examples of such a network connection can include a local area network (LAN), wide area network (WAN), personal area network (PAN), and the Internet, among others.

As shown in FIG. 3, the MRI stored in the memory resources 330 can be segmented into a number of modules 322, 324 that when executed by the processing resources 328 can perform a number of functions. As used herein a module includes a set of instructions included to perform a particular task or action. The number of modules 322, 324 can be sub-modules of other modules. For example, the GUI module 324 can be a sub-module of the event module 322 and/or can be contained within a single module. Furthermore, the number of modules 322, 324 can comprise individual modules separate and distinct from one another. Examples are not limited to the specific modules 322, 324 illustrated in FIG. 3.

One or more of the number of modules 322, 324 can include program instructions and/or a combination of hardware and program instructions that, when executed by a processing resource 328, can function as a corresponding engine as described with respect to FIG. 2. For example, the GUI module 324 can include program instructions and/or a combination of hardware and program instructions that, when executed by a processing resource 328 can function as the GUI engine 224.

The machine 326 can include an event module 322, which can include instructions to receive data indicating events of a plurality of releases of an application over a period of time, wherein the events include positive events and negative events.

The machine 326 can include a GUI module 324, which can include instructions to provide a GUI including a timeline portion, a navigation portion, a drill-down portion, and a details portion, which are discussed in further detail in connection with FIGS. 1 and 4.

Referring back to FIG. 1, the GUI 100 can include a number of portions. In some embodiments, the GUI 100 can include a timeline portion 102, a navigation portion 104, and a drill-down portion 106. The GUI 100 can be divided into the three portions 102, 104, 106 as shown in FIG. 1, though embodiments of the present disclosure are not so limited. Different orientations, sizes, and/or configurations of the three portions 102, 104, 106 can be provided.

The timeline portion 102 can include a timeline 108 corresponding to the release of the application. The timeline 108 can correspond to a particular period of time defined by a beginning on the left hand side of the GUI 100 and an ending on the right hand side of the GUI 100. The period of time displayed is not intended to be limited herein, and, in some embodiments, can be user configurable. Additionally, the units used to display the timeline (e.g., hours, days, months, etc.) are not intended to be limited by embodiments herein. The timeline 108 can include more than one release of an application over a period of time.

The timeline 108 can include a display element (sometimes referred to as a "timeline element") for each of the execution events in a respective portion of the timeline 108 corresponding to an execution time of the event. As shown in FIG. 1, for example, a display element 110-1, a display element 110-2, and a group of display elements 110-3 are shown in the first portion 102. By the manner in which they are displayed, the display elements 110 can indicate information relating to events. For instance, display elements for negative events can be displayed at a different vertical position in the GUI 100 than display elements for positive events. In some embodiments, positive events can be grouped above the timeline 108 and negative events can be grouped below the timeline 108. As shown, the positive event indicated by display element 110-2 is displayed above the negative event indicated by display element 110-1. Some of the group of display elements 110-3 indicate positive events and some indicate negative events. In some embodiments, a color of a display element can indicate whether the event corresponding thereto is a positive event or a negative event. In some embodiments, the display elements for negative events can be displayed in a first color (e.g., red) and the display elements for positive events are displayed in a second color (e.g., green). The display element for each of the events can be displayed in a size corresponding to a duration of the execution event. The left boundary of a display element can indicate its beginning, the right boundary can indicate its ending.

Embodiments of the present disclosure can allow the ability to quickly navigate to different portions of the timeline 108 that may be of particular relevance to a user. The user can click on a selectable display element, for instance, and be instantly provided with a particular portion of the timeline 108 rather than having to scroll through the timeline 108 and determine such relevant portions manually.

The navigation portion 104 can be configured to display a plurality of options as selectable display elements 114-1, 114-2, 114-3, each corresponding to a respective section (e.g., subset) of the timeline. Selection of one or more of the display elements 114 in the navigation portion 104 can cause a corresponding portion of the timeline 108 to be displayed in the drill-down portion 106. In some embodiments, relevant portions of the timeline 108 can include portions of the timeline having a certain quantity of events 110 that occurred therein. The navigation portion 104 can be configured to display a plurality of selectable display elements 114-1, 114-2, 114-3, each corresponding to a respective section of the timeline 108 having a different quantity of events 110 occurring therein. In some embodiments, each of the options 114, upon being selected, is configured to cause a respective section of the timeline 108 having a threshold-exceeding quantity of events 110 therein to be displayed by the drill-down portion 106.

As previously discussed, more than one application can be displayed by the GUI 100. In some embodiments, one or more of the options 114, upon being selected, is configured to cause a respective section of the timeline 108 to be displayed by the drill-down portion 106 having one or more applications exceeding a priority threshold. In some embodiments, priority can be determined based on inputs and/or direction received from an external system (e.g., an event generator). In some embodiments, priority can be determined based on an importance of the application's availability in the market. Such importance can depend, for instance, on application usage and/or priority defined by an entity releasing the application (e.g., a company). In some embodiments, priority can be received as input in the format and/or language of json, xml, and/or yaml. For example, priority for a particular application product can take the form: [{"productName"; "Product5", "priority": 2}, {"productName": "Product5", "priority": 5}].

In some embodiments, priority can be determined based on release date. For instance, a release date of an application can be taken as input and the priority of the application can be determined based on the determined priority discussed above in addition to the release date. For example, priority can be determined based on: {{Nearer the release date+ Higher priority of the product/application}}.

Where "selection" of a display element, is discussed herein, it is intended that, selection includes an interaction between an input device (e.g., a mouse, keyboard, etc.) and the display element. Interactions include passive interactions, such as hovering, and active interactions, such as clicking and/or entering text, for instance. Embodiments of the present disclosure are not limited to particular types of display elements; for example, a display element can be a selectable element, a hyperlink, an icon, a text entry field, and/or an image, among, others. In some embodiments the selectable display elements 114 may be provided with a text field configured to receive alphanumeric inputs. The alphanumeric inputs may supplement the options corresponding to the selectable display elements 114. For example, the alphanumeric inputs may define variables within the options.

In some embodiments, the timeline 108 can be "sectioned" into equal lengths of time and the quantity of events occurring in each section can be determined and ranked. In some embodiments, each section of the timeline 108 can correspond to a different length of time and each section can include a same number of events that occurred therein.

The selectable display elements 114 of the navigation portion 104 can be displayed in different sizes. The different sizes can correspond to sections of the timeline 108 having different quantities and/or priorities of events that occurred therein. For instance, upon being selected, a first selectable option 114-1 can be configured to cause a first section of the timeline 108 having a quantity of events therein exceeding a first threshold to be displayed by the drill-down portion 106. A second selectable option 114-2, upon being selected, can be configured to cause a second section of the timeline 108 having a quantity of events therein exceeding a second threshold (e.g., a higher threshold than the first) to be displayed by the drill-down portion 106. A third selectable option, upon being selected, can be configured to cause a third section of the timeline 108 having a quantity of events therein exceeding a third threshold (e.g., higher than the second) to be displayed by the drill-down portion 106. As shown in FIG. 1, a selection made in the navigation portion 104 caused a section of the timeline 108 to be displayed by the drill down portion 106 that includes a display element 110-5 (indicating a positive event) and a display element 110-4 (indicating a negative event).

The sections of the timeline 108 having the different quantities of events occurring therein can be displayed as a highlighted area of the timeline 108. Highlighted areas can be displayed in one or both of the timeline portion 102 and the drill-down portion 106. For instance, the timeline portion 102 is shown as including a highlighted portion 112-1 and a highlighted portion 112-2, and the drill-down portion 106 is shown as including a highlighted portion 112-3. Such highlighting can further increase user awareness of relevant areas of the timeline 108, making the information conveyed by timeline 108 readily understandable.

In some embodiments, a user can select one or more of the timeline elements 110 in order to be provided with details regarding the event corresponding to the selected timeline element. Selection can be made from the timeline portion 102, in some embodiments, from the drill-down portion 106, in some embodiments, or both.

Figure 4:
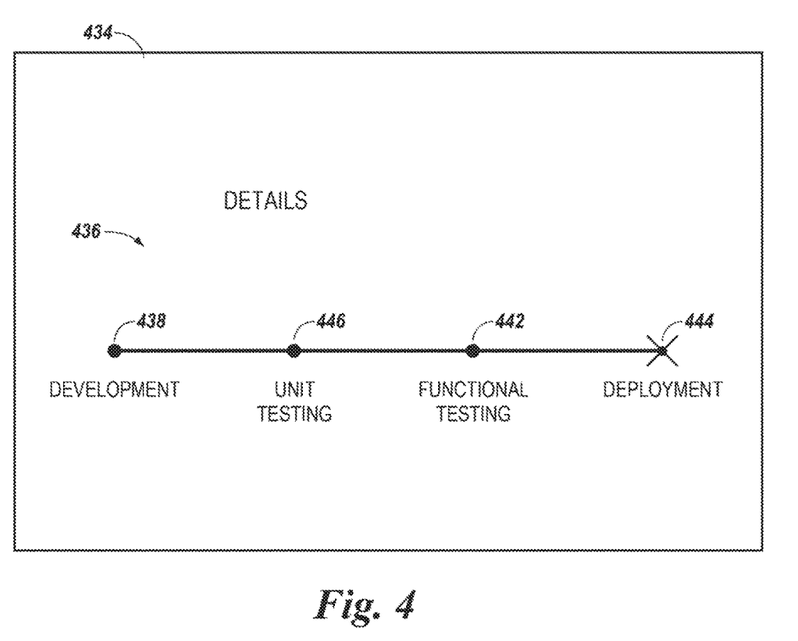
FIG. 4 illustrates a details portion of a GUI according to a number of embodiments of the present disclosure.

FIG. 4 illustrates a details portion 434 of a GUI according to a number of embodiments of the present disclosure. The details portion 434 can be provided responsive to a selection of one or more of the timeline elements 110 from the timeline portion 102 and/or the drill-down portion 106 previously described in connection with FIG. 1, for instance. The details portion 434 can be a pop-up window, for instance, which may be adjacent to any of the portions 102, 104, 106, though embodiments of the present disclosure are not so limited.

The details portion 434 can be configured to provide details about the selected event. In some embodiments, the details portion can display an indication of a portion (e.g., stage and/or phase) of the release in which a negative event caused the release to fail. As previously discussed, the release can include development 438, unit testing 440, functional testing 442, and/or deployment 444. The details portion 434 can display these phases as a sequential timeline in some embodiments. The details portion 434 can display an indication of at a phase of the release in which the release did not fail before the negative event cause the release to fail. For instance, as shown in FIG. 4, the release was successful through development 438, unit testing 440, functional testing 442 (indicated by the dots on the sequential timeline), but failed at deployment 444 (indicated by an "X" on deployment 444).

Embodiments herein can automatically (e.g. without user input) identify patterns and/or correlations in events (which may or may not be displayed by a GUI as described herein). In some embodiments, for instance, a determination can be made that a particular phase of the release (e.g., a unit testing phase) is failing at a rate that exceeds a threshold (e.g. a threshold number of negative unit testing events in a particular period of time). In response, embodiments herein can provide a notification to a user. The notification can include a message indicating that the phase should be revised and/or improved.

Further, embodiments herein can revise aspects of (or a portion of) an application's life cycle based on a determined pattern of failures. In some embodiments, an order of the phases of an application's life cycle can be modified, aspects of those phases may be modified, and certain phases may be enhanced or removed from the lifecycle.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory, machine-readable medium storing instructions which, when executed by a processor, cause the processor to:
receive indications associated with execution events of a release of an application over a period of time, wherein the execution events include positive execution events and negative execution events; and
provide a graphical user interface (GUI) configured to:
display a timeline in a first portion of the GUI corresponding to the release of the application over the period of time, wherein the timeline includes a display element for each of the execution events in a respective portion of the timeline corresponding to an execution time of the execution event;
provide a plurality of selectable options, wherein each option, upon being selected, causes a different section of the timeline to be displayed by a second portion of the GUI;
display each of the plurality of selectable options in a different size;
display timeline elements for negative execution events at a different vertical position in the GUI relative to timeline elements for positive execution events; and
display at least one different section of the timeline as a highlighted area.

2. The medium of claim 1, wherein the execution events include:
development events;
unit testing events;
functional testing events; and
deployment events.

3. The medium of claim 1, wherein the instructions cause the processor to receive the indications associated with execution events from a back-end execution event generator.

4. The medium of claim 1, wherein the display element for each of the execution events is displayed by the GUI in a horizontal width corresponding to a duration of the execution event.

5. The medium of claim 1, wherein:
the negative execution events include execution events wherein a portion of the release of the application failed; and
the positive execution events include execution events wherein the portion of the release of the application did not fail.

6. The medium of claim 1, wherein the display elements for the negative execution events are displayed in a first color and the display elements for the positive execution events are displayed in a second color.

7. The medium of claim 1, wherein each option, upon being selected, causes a respective section of the timeline having a threshold-exceeding quantity of execution events therein to be displayed by the second portion of the GUI.

8. The medium of claim 7, wherein the plurality of selectable options includes a first selectable option, a second selectable option, and a third selectable option, and wherein:
upon being selected, the first selectable option causes a first section of the timeline having a quantity of execution events therein exceeding a first threshold to be displayed by the second portion of the GUI;
upon being selected, the second selectable option causes a second section of the timeline having a quantity of execution events therein exceeding a second threshold to be displayed by the second portion of the GUI;
upon being selected, the third selectable option causes a third section of the timeline having a quantity of execution events therein exceeding a third threshold to be displayed by the second portion of the GUI.

9. The medium of claim 1, wherein each section of the timeline corresponds to a different length of time.

10. The medium of claim 9, wherein each section of the timeline includes a same number of execution events therein.

11. A method, comprising:
receiving data indicating execution events of a plurality of releases of an application over a period of time, wherein the execution events include positive execution events and negative execution events; and
providing a graphical user interface (GUI) including:
providing a timeline portion of the GUI by displaying:
a timeline corresponding to the releases of the application over the period of time; and
a timeline element for each of the execution events displayed over a respective portion of the timeline corresponding to an execution time of the execution event;
providing a navigation portion of the GUI by displaying a plurality of selectable display elements, each corresponding to a respective section of the timeline having a different quantity of execution events occurring therein;
providing a drill-down portion of the GUI by displaying the section of the timeline corresponding to one of the selectable display elements responsive to a selection of the one of the selectable display elements in the navigation portion;
displaying each of the plurality of selectable display elements in a different size;
displaying timeline elements for negative execution events at a different vertical position in the GUI than timeline elements for positive execution events; and
displaying each section of the timeline having the different quantity of execution events occurring therein as a highlighted area of the timeline.

12. The method of claim 11, wherein the method includes:
identifying a pattern of execution events of the plurality of releases of the application based on the received data indicating execution events of a plurality of releases of the application over the period of time; and
providing a notification responsive to the identification.

13. The method of claim 11, wherein the method includes revising a portion of a lifecycle associated with the plurality of releases of the application based on a determined pattern of the negative execution events.

14. The method of claim 11, wherein the method includes:
receiving data indicating execution events of a plurality of releases of a plurality of applications over the period of time; and
providing the navigation portion of the GUI by displaying a selectable display element corresponding to a respective section of the timeline having an application of the plurality of applications that exceeds a priority threshold.

15. A system, comprising:
a processor; and
a memory storing instructions executable by the processor to:
provide a graphical user interface (GUI) including:
a timeline portion of the GUI configured to display a timeline corresponding to a plurality of releases of an application over a period of time, wherein the timeline portion includes a timeline element for each execution event of the plurality of releases displayed over a respective portion of the timeline corresponding to a beginning time and an ending time of the execution event, and wherein timeline elements associated with negative execution events are displayed at a different vertical position in the GUI relative to timeline elements associated with positive execution events;

a navigation portion of the GUI configured to display a plurality of selectable display elements, each displayed in a different size and corresponding to a respective section of the timeline having a different quantity of execution events occurring therein;

a drill-down portion of the GUI configured to display the section of the timeline corresponding to one of the selectable display elements responsive to a selection of the one of the selectable display elements, wherein the section of the timeline corresponding to the one of the selectable display elements includes a timeline element for each of the execution events that occurred therein, and wherein at least one different section of the timeline is displayed as a highlighted area; and a details portion configured to display details associated with a particular execution event responsive to a selection of a particular timeline element corresponding to the execution event from the timeline portion or the drill-down portion.

16. The system of claim 15, wherein the details portion is configured to display an indication of a phase of the release in which a negative execution event caused the release to fail.

17. The system of claim 16, wherein the phase is one of:
a development phase;
a unit testing phase;
a functional testing phase; and
a deployment phase.

18. The system of claim 17, wherein the details portion is configured to display an indication of at a phase of the release in which the release did not fail before the negative execution event cause the release to fail.

19. The system of claim 15, wherein the details portion is configured to display a development phase, a unit testing phase, a functional testing phase, and a deployment phase of the release as a sequential timeline.

* * * * *